United States Patent [19]

Scribner

[11] 4,162,097
[45] Jul. 24, 1979

[54] VEHICLE CAB STRUCTURE

[75] Inventor: Frank F. Scribner, Stout, Iowa

[73] Assignee: Royal Industries, Inc., Waterloo, Iowa

[21] Appl. No.: 742,689

[22] Filed: Nov. 15, 1976

[51] Int. Cl.² ........................... E05D 15/28; B60J 1/00
[52] U.S. Cl. .................................... 296/190; 49/246; 296/146; 296/151
[58] Field of Search ............... 49/246; 296/28 C, 146, 296/151

[56] References Cited

U.S. PATENT DOCUMENTS

| | | |
|---|---|---|
| 3,016,261 | 1/1962 | Tatter ..................................... 49/246 |
| 3,158,395 | 11/1964 | Smith ..................................... 49/246 |
| 3,457,675 | 7/1969 | Armstrong ............................. 49/246 |

*Primary Examiner*—Richard A. Bertsch
*Attorney, Agent, or Firm*—Wegner, Stellman, McCord, Wiles & Wood

[57] ABSTRACT

A vehicle construction comprising a vehicle frame, spaced apart wheels on the frame, and an operator cab mounted on the frame between the wheels. The cab has an access door with generally vertically extending sides adjacent to one of the wheels and the door has a lower extremity below the uppermost extent of the adjacent wheel and a relief in one side thereof at the lower extremity of the door. A generally horizontally directed link is within the cab and has one end pivoted to the cab at a location intermediate the sides of the door and an opposite end pivoted to the door on the interior surface thereof between the side having the relief and the intermediate location at which it is connected to the cab. There is a horizontally slidable connection between the door adjacent the side having a relief thereon and the cab so that when the door is opened, the door will rotate and be translated to allow the lower extremity to clear the wheel and permit the door to fully open.

5 Claims, 4 Drawing Figures

VEHICLE CAB STRUCTURE

BACKGROUND OF THE INVENTION

This invention relates to vehicle cab constructions for vehicles such as farm tractors or the like.

Recent years have seen a vast upsurge in the use of fully enclosed operator stations in farm tractors. At the same time, there has been a trend to larger and larger tractors which, of course, requires the use of larger and larger wheels. In the typical situation, the cab used to fully enclose the operator station will be located between the spaced rear wheels of the tractor and will have one or more side-opening doors. Because of the adjacency of the wheels to the side of the cab, and the fact that the large wheels in use today frequently extend upwardly above the floor of the cab, the wheels frequently obstruct movement of the doors to a fully opened position whereat the operator may easily enter or exit the cab. As a consequence, the operator must squeeze through an opening considerably smaller in size than was intended by the designer of the cab structure.

SUMMARY OF THE INVENTION

It is the principal object of the invention to provide a new and improved cab structure for vehicles. More specifically, it is an object of the invention to provide such a structure for vehicles such as farm tractors or the like wherein a side-opening door may move to a fully opened position regardless of the size and position of adjacency of the vehicle wheels.

An exemplary embodiment of the invention achives the foregoing object in a vehicle construction including a vehicle frame having spaced apart wheels. An operator cab is mounted on the frame between the wheels and has an access door with generally vertically extending sides adjacent to one of the wheels. The door has a lower extremity below the uppermost extent of the wheel and a relief in one side thereof at the lower extremity. A generally horizontally directed link is within the cab and has one end pivoted to the cab at a location intermediate the sides of the door and an opposite end pivoted to the door on the interior surface thereof between the side having the relief and the intermediate location mentioned above. A horizontally slidable connection extends between the door adjacent the side having the recess and the cab so that when the door is opened, the door will be rotated to open the door opening and translated to allow the lower extremity to clear the wheel, allowing the door to be fully opened.

In a highly preferred embodiment, a pair of spaced, generally horizontally aligned links are employed and means are provided within the cabs for pivotally connecting corresponding ends of the links to the cab on substantially coaxial, first vertical axes at locations intermediate the sides of the door. Second means are located within the cab and pivotally connect the opposite ends of the links to the interior surface of the door at a location between the door side having the relief therein and at the intermediate location at which the other ends of the links are pivoted to the cab and on substantially coaxial second vertical axes. The cab is provided with a downwardly opening, generally horizontally extending channel above the door and there is further provided an upwardly extending pin on the door adjacent the side having the relief therein which is received in the channel.

Preferably, the linkage further includes a telescoping link pivotally connected to one of the links and to the cab, the latter pivot being adjacent the side of the door having the relief therein.

In a highly preferred embodiment, the first and second substantially vertical axes are tipped slightly from the vertical and away from the wheel so that as the door is opened, it is translated upwardly a small degree to assist in clearing the wheel.

In a highly preferred embodiment, the ends of the links pivotally connected to the door are connected to each other by a substantially vertically extending rod which defines the second pivot means.

Other objects and advantages will become apparent from the following specification taken in connection with the accompanying drawings.

DESCRIPTION OF THE PREFERRED EMBODIMENT

Figure 1:
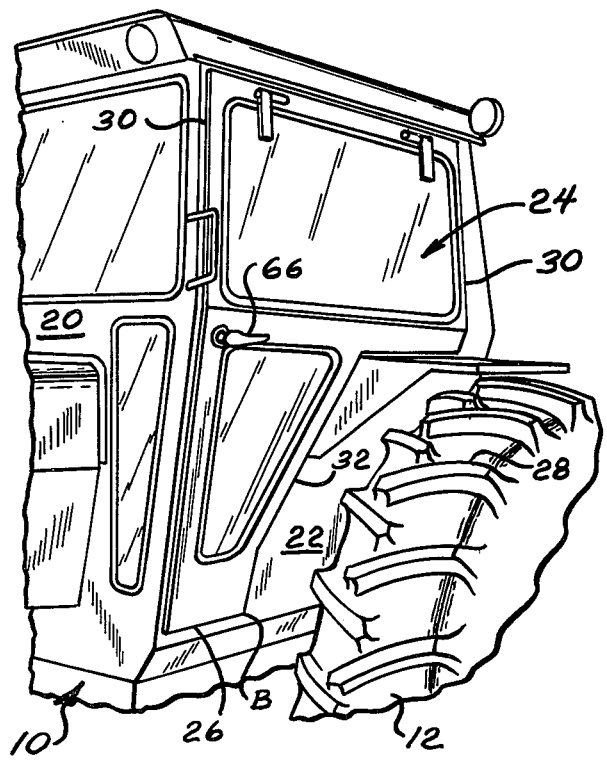
FIG. 1 is a fragmentary perspective view of a vehicle embodying a cab construction made according to the invention.
Figure 4:
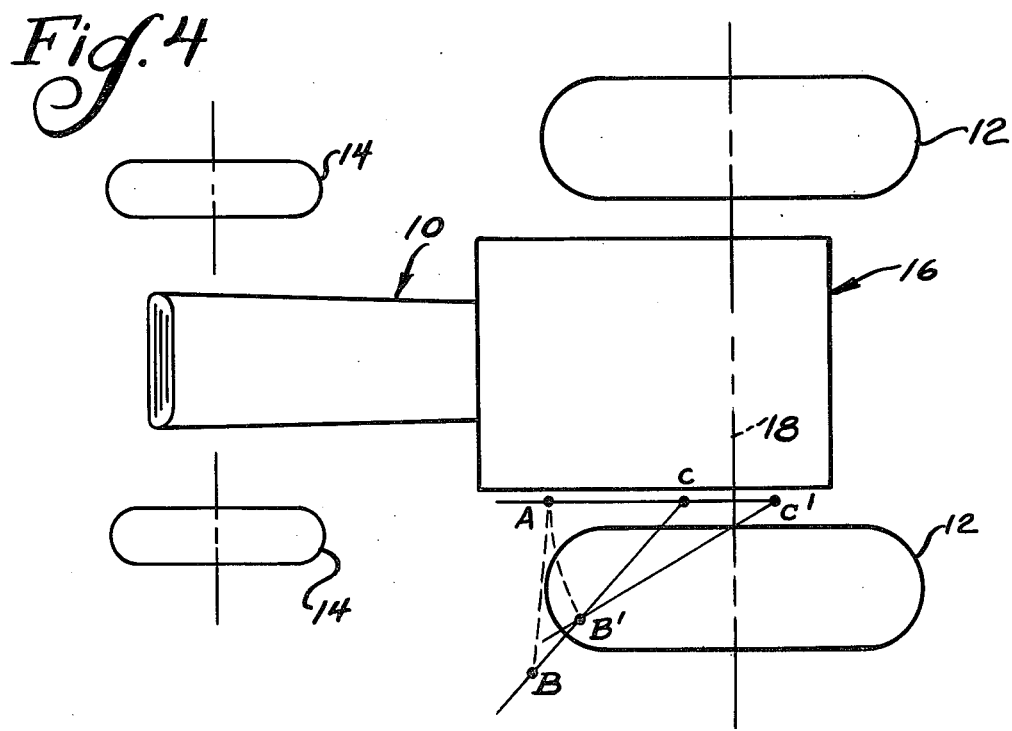
FIG. 4 is a schematic view of a vehicle comparing door movement between a door construction in a cab made according to the invention and door movement in a conventionally constructed cab.

An exemplary embodiment of a vehicle construction made according to the present invention is seen in the drawings and with reference to FIGS. 1 and 4 is seen to include a vehicle frame, generally designated 10, having spaced apart rear wheels 12 thereon as well as front wheels 14 (FIG. 4). A cab structure, generally designated 16, is mounted on the frame 10 between the wheels 12 such that the sides of the cab structure 16 are adjacent to the wheels 12. Typically, the axis of rotation 18 (FIG. 4) of the wheels 12 will extend through a vertical projection of the cab and will immediately underlie the floor thereof.

With reference to FIG. 1, the cab includes a front 20 and an adjacent side 22 provided with an access opening for a door, generally designated 24. The door 24 includes a lower extremity 26 that will be generally disposed at or about the level of the floor of the cab 16 and considerably below the upper extremity 28 of the adjacent wheel 12. The door 24 includes generally vertically extending sides 30 and the rearmost side 30 at the lower extremity 26 includes a relief or notch 32. The rearwardmost corner of the lower extremity 26 at the relief 32 is designated B in a structure made according to the invention. As seen in FIG. 4, if the door 24 were pivoted about its rearmost edge, a point designated C', upon opening the same, the point B, designated B', would quickly intercept tire 12 to preclude the door from opening fully. The present invention eliminates such blockage by translating the door 24 as it is opened so that the pivot point, which will be originally in the position C' shown in FIG. 4 will move to the position designated C so that the point B will move in the path indicated in FIG. 4 to allow the wheel 12 to be cleared. Means by which such is accomplished will now be described in detail with particular reference to FIGS. 2 and 3.

The interior of the cab 16, at the upper edge 34 of the access opening for the door 24 is provided with a bearing block 36. The bearing block 36 is located intermediate the sides of the access opening, that is, at a location between the sides 30 of the door 24. Just inside the cab near a lower extremity 38 of the access opening there is provided a pivot 40 which is substantially coaxial with the bearing block 36 to define a substantially vertically pivot axis. The bearing block 36 and the pivot 40 constitute a first pivot means.

A first link 42 has an L-shaped rod 44 welded thereto with the vertically extending portion thereof journalled in the bearing block 36. A lower link 46 has a similar L-shaped rod 48 welded to one end thereof to be pivotally received in the bearing 40. As a result, the links 42 and 46 are generally horizontally extending and pivoted to the cab.

The ends of the links 42 and 46 remote from the L-shaped rods 44 and 48 are secured to a generally vertically extending rod 50, as by welding, and include apertures 52 therein. Bearing blocks 54, constituting a second pivot means, extend through the apertures 52 and about the rod 50 to journal the same to the interior surface of the door 24 at a location that is between the location of the bearing block 36 and the bearing 40 and the rearmost side 30 of the door 24, that is, the side 30 having the relief 32 therein.

A telescoping link 56 has one end pivotally connected at 58 to the interior of the cab adjacent the rear side 30 of the door 24 and its opposite end pivotally connected as at 60 to the link 46 intermediate its ends. The link 50 serves to stabilize movement of the linkage previously mentioned and, in particular, the link 46, as will be seen.

The exterior of the cab 16 along the upper edge 34 of the access opening includes a horizontally extending, downwardly open channel 62 adjacent the rear edge of the opening. The rear side 30 of the door mounts an upwardly extending pin 64 which is slidably received in the channel 62 and which defines the point C, as seen in FIG. 4.

Figure 2:
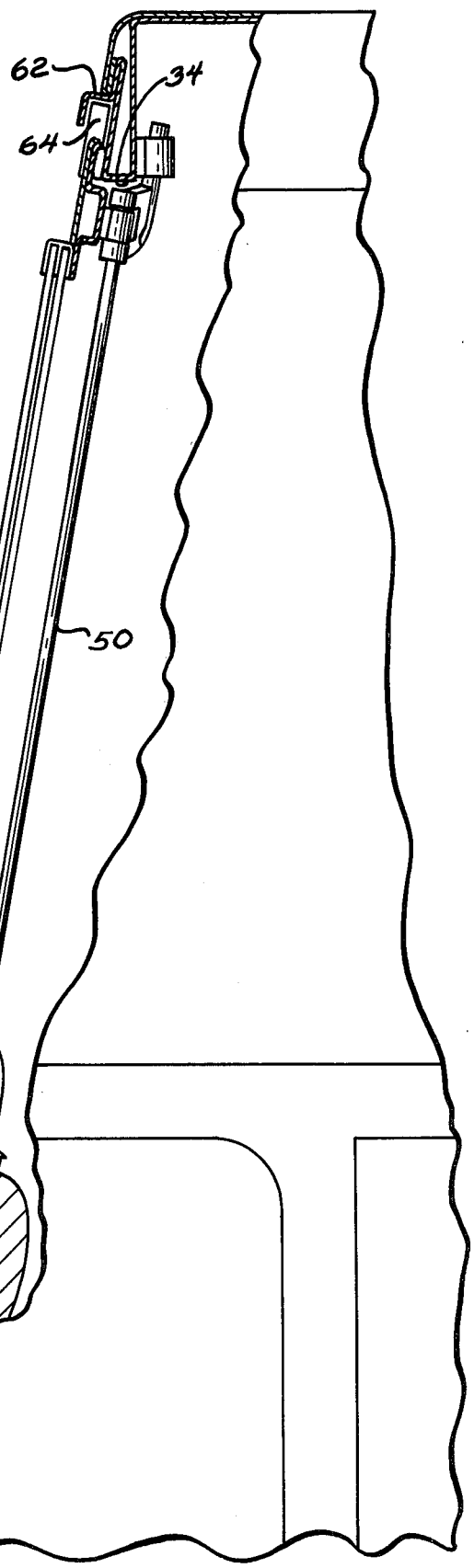
FIG. 2 is a sectional view through a door of the vehicle cab.
Figure 3:
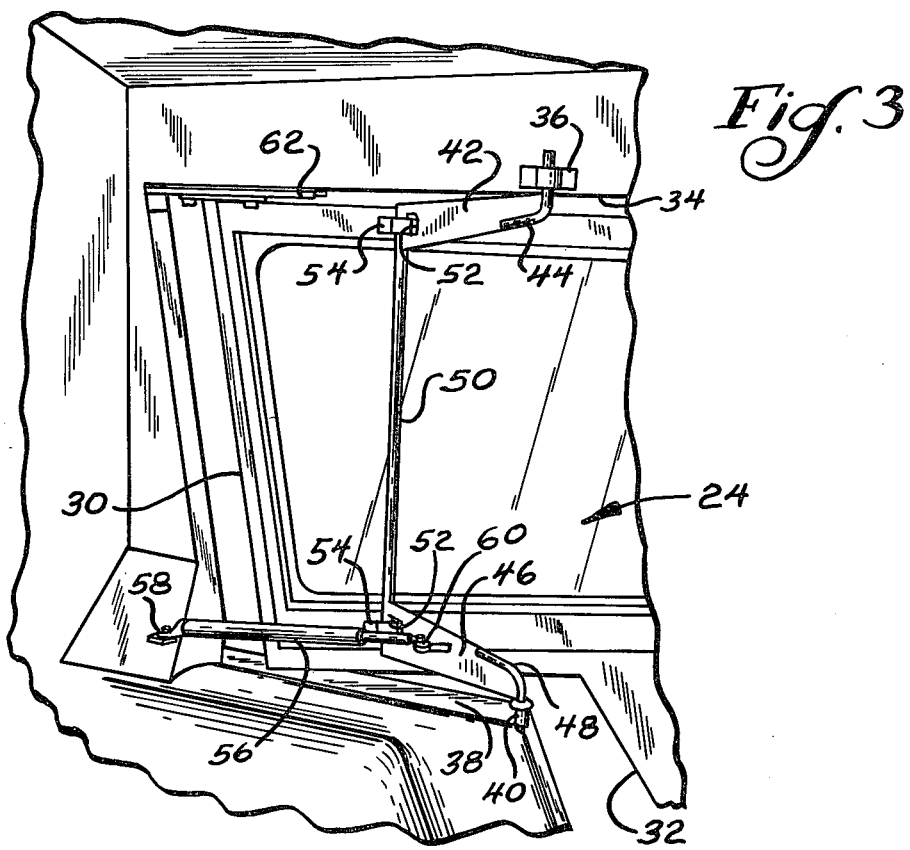
FIG. 3 is a fragmentary perspective view of a cab construction from the interior thereof.

As best seen in FIG. 2, the axis defined by the bearings 36, 40 and 54 is not truly vertical, but rather, is tipped slightly away from the vertical and away from the adjacent wheel 12.

When a door made according to the present invention is opened, by the grasping of a handle 66 (FIG. 1) or the like, the links 42 and 46 and their connection to the door 24 will cause the door to move forwardly on the vehicle frame, that is, translate. The pin 64, by reason of its being slidably captured in the channels 62, will cause the door to pivot. Because the door is translating as it is being rotated, the location of the pivot point will shift from the location C' shown in FIG. 4 to that designated C in the same figure as the door moves from a fully closed to a fully open position. Because of the translation, the point B will pass by the front edge of the tire or wheel 12 so that opening of the door will not be obstructed thereby, therefor allowing the door to be fully opened.

It will also be appreciated by those skilled in the art that the slight canting or tilting of the pivot axes away from the tire will cause the forwardmost portions of the door to be swung slightly upwardly at the same time rotation and translation is occurring to further ensure that the door will clear the wheel 12.

I claim:

1. A vehicle construction comprising:
   a vehicle frame;
   spaced apart wheels on said frame;
   an operator cab mounted on said frame between said wheels and having an access opening with opposed sides and closeable by an access door with generally vertically extending sides and adjacent to one of said wheels, said door having a lower extremity below the uppermost extent of said one wheel and a relief in one side thereof and at said lower extremity;
   a generally horizontally directed link within said cab having one end pivoted to said cab at a location intermediate said opening sides and an opposite end pivoted to said door on the interior surface thereof between said door one side and said intermediate location; and
   a horizontally slidable connection between said door adjacent said door one side and said cab;
   whereby when said door is opened, said door will be rotated and translated to allow said lower extremity to clear said one wheel.

2. A vehicle construction comprising:
   a vehicle frame;
   spaced apart wheels on said frame;
   an operator cab mounted on said frame between said wheels and having an access opening with spaced vertical sides and closeable by an access door with generally vertically extending sides and adjacent to one of said wheels, said door having a lower extremity below the uppermost extent of said one wheel and a relief in one side thereof and at said lower extremity;
   a pair of spaced, generally horizontally extending, aligned links,
   first means within said cab pivotally connecting corresponding ends of said links to said cab on substantially coaxial, first vertical axes at locations intermediate the sides of said opening;
   second means within said cab pivotally connecting the opposite ends of said links to the interior surface of said door at a location between said door one side and said intermediate locations on substantially coaxial, second vertical axes;
   a downwardly opening, generally horizontally extending channel on said cab above said door; and
   an upwardly extending pin on said door adjacent said door one side received in said channel.

3. The vehicle construction of claim 2 further including a telescoping link pivotally connected to one of said links and to said cab adjacent said door one side.

4. The vehicle construction of claim 2 wherein said first and second substantially vertical axes are tipped slightly from the vertical and away from said one wheel.

5. The vehicle construction of claim 2 wherein said other ends of said links are connected by a substantially vertically extending rod defining said second means.

* * * * *